United States Patent [19]

Suzuki et al.

[11] Patent Number: 5,588,416
[45] Date of Patent: Dec. 31, 1996

[54] FUEL CONTROL SYSTEM FOR GASEOUS FUELED ENGINE

[75] Inventors: Toshio Suzuki; Yoshikatsu Iida, both of Iwata, Japan

[73] Assignee: Yamaha Hatsudoki Kabushiki Kaisha, Iwata, Japan

[21] Appl. No.: 401,344

[22] Filed: Mar. 9, 1995

[30] Foreign Application Priority Data

Mar. 15, 1994 [JP] Japan .................................. 6-044235

[51] Int. Cl.⁶ ............................................. F02D 41/14
[52] U.S. Cl. ........................... 123/684; 123/687; 123/701
[58] Field of Search .................................. 123/679, 680, 123/681, 682, 683, 684, 685, 687, 688, 699, 700, 701, 702, 525, 527, 585

[56] References Cited

U.S. PATENT DOCUMENTS

| | | | |
|---|---|---|---|
| 3,646,924 | 3/1972 | Newkirk et al. | 123/576 |
| 3,996,908 | 12/1976 | Brown, III et al. | 123/585 |
| 3,996,909 | 12/1976 | Fischer | 123/585 |
| 4,020,813 | 5/1977 | Hattori et al. | 123/700 |
| 4,089,311 | 5/1978 | Brettschbeider et al. | 123/702 |
| 4,216,757 | 8/1980 | Romann | 123/179.15 |
| 4,263,882 | 4/1981 | Tezuka et al. | 123/432 |
| 4,263,883 | 4/1981 | Treible | 123/437 |
| 4,285,700 | 8/1981 | Fox | 48/180.1 |
| 4,304,211 | 12/1981 | Tezuka et al. | 123/585 |
| 4,327,689 | 5/1982 | Rachel | 123/436 |
| 4,346,682 | 8/1982 | Mader | 123/179.16 |
| 4,347,824 | 9/1982 | Pierson | 123/527 |
| 4,364,364 | 12/1982 | Subramaniam | 123/527 |
| 4,369,749 | 1/1983 | Sugi | 123/439 |
| 4,369,751 | 1/1983 | Batchelor et al. | 123/527 |
| 4,385,613 | 5/1983 | Yoshida et al. | 123/685 |
| 4,404,947 | 9/1983 | Swanson | 123/527 |
| 4,413,607 | 11/1983 | Batchelor et al. | 123/590 |
| 4,457,279 | 7/1984 | Teramura et al. | 123/439 |
| 4,483,303 | 11/1984 | Ishikawa et al. | 123/527 |
| 4,485,792 | 12/1984 | van der Weide | 123/527 |
| 4,492,204 | 1/1985 | Bertsch et al. | 123/685 |
| 4,492,205 | 1/1985 | Jundt et al. | 123/688 |
| 4,517,134 | 5/1985 | Nakamura et al. | 261/39.2 |
| 4,528,957 | 7/1985 | Jundt et al. | 123/688 |
| 4,541,397 | 9/1985 | Young | 123/527 |
| 4,545,350 | 10/1985 | Nakamura et al. | 123/439 |
| 4,553,519 | 11/1985 | Masson | 123/527 |

(List continued on next page.)

FOREIGN PATENT DOCUMENTS

| | | | |
|---|---|---|---|
| 182223 | 5/1986 | European Pat. Off. | |
| 0346989 | 6/1989 | European Pat. Off. | |
| 346989 | 12/1989 | European Pat. Off. | |
| 921068102 | 9/1992 | European Pat. Off. | |
| 3321424 | 6/1983 | Germany . | |
| 3913358 | 10/1990 | Germany . | |
| 57-23101 | 5/1982 | Japan . | |
| 58-217747 | 12/1983 | Japan . | |
| 59-176444 | 5/1984 | Japan | 123/685 |
| 60-32031 | 7/1985 | Japan . | |
| 62-131908 | 6/1987 | Japan . | |
| 192505 | 4/1989 | Japan . | |
| 2118110 | 5/1990 | Japan . | |
| 2118111 | 5/1990 | Japan . | |
| 2139307 | 5/1990 | Japan . | |
| 2191807 | 7/1990 | Japan . | |
| 1327513 | 4/1971 | United Kingdom . | |
| 2086485 | 5/1982 | United Kingdom . | |
| 2139699 | 5/1984 | United Kingdom . | |
| 865413 | 4/1991 | United Kingdom . | |

OTHER PUBLICATIONS

European Search Report dated Feb. 10, 1993.
European Search Report, Jan. 26, 1993.

*Primary Examiner*—Willis R. Wolfe
*Attorney, Agent, or Firm*—Knobbe, Martens, Olson & Bear

[57] ABSTRACT

A fuel control system for an engine, and particularly one that employs a gaseous fuel and which controls the air-fuel ratio by a feedback control system. The feedback control system is adjusted by a corrective factor that is determined by engine running conditions so as to obtain better control over the desired fuel-air mixture.

62 Claims, 5 Drawing Sheets

U.S. PATENT DOCUMENTS

| | | | |
|---|---|---|---|
| 4,554,896 | 11/1985 | Sougawa | 123/179.16 |
| 4,572,149 | 2/1986 | Hasegawa et al. | 123/700 |
| 4,589,397 | 5/1986 | Stankewitsch | 123/590 |
| 4,606,319 | 9/1986 | Silva | 123/525 |
| 4,628,883 | 12/1986 | Kataoka | 123/682 |
| 4,638,777 | 1/1987 | Fanner et al. | 123/277 |
| 4,638,783 | 1/1987 | Snyder | 123/527 |
| 4,686,951 | 8/1987 | Snyder | 123/527 |
| 4,696,278 | 9/1987 | Ito et al. | 123/493 |
| 4,699,630 | 10/1987 | Lee et al. | 48/180.1 |
| 4,742,808 | 5/1988 | Blumel et al. | 123/688 |
| 4,774,909 | 10/1988 | Dolderer | 123/1 A |
| 4,813,390 | 3/1989 | Bennett | 123/577 |
| 4,813,394 | 3/1989 | St. Clair | 123/527 |
| 4,829,957 | 5/1989 | Garretson et al. | 123/27 GE |
| 4,834,050 | 5/1989 | Uranishi et al. | 123/699 |
| 4,843,558 | 6/1989 | Bergmann et al. | 364/431.03 |
| 4,858,583 | 8/1989 | Sonntag | 123/527 |
| 4,864,991 | 9/1989 | Snyder | 123/344 |
| 4,867,127 | 9/1989 | Quichmayr et al. | 123/527 |
| 4,870,933 | 10/1989 | Mizuno | 123/325 |
| 4,915,081 | 4/1990 | Fujimoto et al. | 123/682 |
| 4,932,378 | 6/1990 | Hitomi et al. | 123/432 |
| 4,936,278 | 6/1990 | Umeda | 123/684 |
| 4,938,199 | 7/1990 | Sato et al. | 123/585 |
| 4,953,516 | 9/1990 | van der Weide et al. | 123/527 |
| 4,970,858 | 11/1990 | Matsuoka | 60/274 |
| 4,982,714 | 1/1991 | Takahashi et al. | 123/684 |
| 5,058,556 | 10/1991 | Fukuma et al. | 123/682 |
| 5,072,712 | 12/1991 | Steinbrenner et al. | 123/684 |
| 5,076,245 | 12/1991 | Jones | 123/527 |
| 5,101,799 | 4/1992 | Davis et al. | 123/527 |
| 5,115,782 | 5/1992 | Klinke et al. | 123/90.11 |
| 5,136,986 | 8/1992 | Jensen | 123/27 GE |
| 5,140,959 | 8/1992 | Durbin | 123/304 |
| 5,150,673 | 9/1992 | Hoshiba et al. | 123/179.15 |
| 5,150,690 | 9/1992 | Carter et al. | 123/527 |
| 5,172,678 | 12/1992 | Suzuki | 123/688 |
| 5,207,058 | 5/1993 | Sasaki et al. | 60/284 |
| 5,224,347 | 7/1993 | Yakabe et al. | 60/274 |
| 5,293,741 | 3/1994 | Kashiyama et al. | 60/284 |
| 5,337,722 | 8/1994 | Kurihara et al. | 123/527 |
| 5,433,185 | 7/1995 | Toyoda | 123/682 |

FUEL CONTROL SYSTEM FOR GASEOUS FUELED ENGINE

BACKGROUND OF THE INVENTION

This invention relates to a fuel control system for a gaseous fueled engine, and more particularly to an improved feedback fuel control system for an engine.

It has been proposed to operate internal combustion engines on gaseous fuels such as LPG, LNG, CNG (liquid petroleum gas, liquid natural gas, or natural gas). These fuels have been found to promote longer engine life and also offer the opportunity of conserving natural resources and providing better exhaust emission control.

Normally the fuel is supplied to a charge former where it is metered and mixed with air to form a charge that is delivered to the engine through its induction system. It has been proposed to employ a so-called air valve or constant depression type of carburetor for mixing the fuel with the incoming air. This type of charge former has been found to provide better fuel control with these particular types of gaseous fuels. The main fuel adjustment is set with these carburetors by a movable valve element which controls the effective air flow area. Frequently this element is a sliding piston, although pivoted valves may also be employed. A metering rod is connected to the movable element and cooperates with a jet for controlling the size of the fuel flow orifice. This controls the amount of fuel flowing to the engine and hence the mixture strength.

With this type of charge former or with more conventional fixed venturi types of charge formers, the amount of fuel delivered can be fine tuned by mixing a proportion of air with the fuel that is delivered to the metering jet. This air mixture can be controlled from a sensor such as an oxygen sensor to provide very effective feedback control. Such an arrangement is shown and described in U.S. Pat. No. 5,337,722, entitled "Fuel Control and Feed System for Gas Fueled Engine," issued Aug. 16, 1994, and assigned to the assignee hereof.

As disclosed in that patent, the air bleed control is operated by a stepper motor, and the number of steps is varied in response to the output signal from the sensor so as to maintain the air-fuel ratio at a stoichiometric value. It has been found, however, that improvements are possible with this type of arrangement.

It is, therefore, a principal object of this invention to provide an improved fuel control system and method of controlling fuel for an engine that will be more responsive to the actual needs in its feedback control operation.

With the previously proposed system, when it has been determined that the mixture is not a desired or stoichiometric mixture, the stepper motor is moved to a position that has been memorized from previous experiences as providing a stoichiometric ratio. This step position is basically independent of the engine running condition.

It has been found, however, that the amount of control required varies with engine running characteristics, and specifically engine load. This may be understood partially by reference to FIG. 1, which is a curve showing engine output or load in relation to speed at various stepper motor step positions. The step positions shown are with a control where the stepper motor moves through 200 steps from a fully closed zero position to a fully opened position.

In the fully closed position there is no dilution of the fuel that is supplied. The practical effect of this is that the actual step number should be lower during high load operations and may be increased during low load operations to maintain stoichiometric air-fuel mixture. Thus, the step adjust, which was constant with the prior art type of constructions, must be varied in relation to load in order to attain the target stoichiometric air-fuel mixture.

It is, therefore, a still further object of this invention to provide a feedback control for the fuel supply of an internal combustion engine wherein the feedback control is varied in relation to engine load.

This type of system operates the stepper motor to control a flow orifice, and that stepper motor is moved through a number of steps based upon a feedback coefficient (FK), which is multiplied by the step number (STP) in accordance with the following relationship:

$$STP = FK \cdot STP$$

As the engine conditions change, the feedback control also is changed over a time period in accordance with the relationship $dFK/dt$.

Another problem with the prior art type of operations may be understood by reference to FIG. 2, which shows actual fuel flow in relation to intake air flow at three positions: stepper motor fully closed (STP=0), no fuel dilution; stepper motor half opened (STP=100), partial fuel dilution; and stepper motor fully opened (STP=200), maximum fuel dilution. It will be seen in the range of low air volume that the fuel flow does not vary linearly with air flow. That is, in order for fuel to flow into the venturi section formed by the variable throat, the intake air volume must be above a predetermined pressure so as to generate the required negative pressure for the venturi to function. This may be in the range of −4 mm of mercury gage pressure. Therefore, with the prior art structures it is difficult to maintain the target or stoichiometric air-fuel ratio in the range where the intake air volume is low, such as the range shown in FIG. 2 as AA.

It is, therefore, a still further object of this invention to provide an improved feedback control for the fuel flow of an engine that will provide the desired amount of fuel under all running conditions.

The prior art systems also made their feedback adjustment during a fixed time intervals regardless of the running condition of the engine. It has been found that this may not offer the maximum utilization of the catalyst, particularly when a three-way catalyst is employed. Such three-way catalysts operate to oxidize carbon monoxide (CO) and hydrocarbons (HC) and reduce oxides of nitrogen ($NO_x$). FIG. 3 is a graphical view showing the cleaning efficiency on these three types of exhaust gas constituents in relation to the frequency of application of the feedback control. It will be seen from these curves that the feedback frequency also is highly important in controlling the treatment of exhaust gases.

It is, therefore, a still further object of this invention to provide an improved fuel control system for an engine embodying feedback control and wherein the intervals of feedback frequency are varied in response to the engine running conditions.

FIG. 4 is a graphical view showing how the feedback frequency should be varied in response to engine running conditions such as intake air volume to achieve maximum efficiency of the catalyst. It is, therefore, a still further object of the invention to provide a feedback control system for the fuel supply of an engine wherein the frequency of feedback control is increased as the air flow to the engine increases.

SUMMARY OF THE INVENTION

A first feature of this invention is adapted to be embodied in a method of controlling the mixture strength of an engine with a feedback control. The method comprises the steps of supplying fuel to a charge former in an amount determined by at least one engine running condition. The mixture strength is then sensed and compared with the desired mixture strength. The amount of fuel supplied is adjusted in a direction to attain the desired mixture strength, but the character of the steps that adjustment is varied in response to at least one engine running condition.

Another feature of the invention is adapted to be embodied in a charge forming system for an engine having an induction path. The charge forming device is provided with a fuel metering device that meters the amount of fuel supplied to the induction path in response to at least one engine running condition. A sensor is provided in the engine for sensing the actual mixture strength delivered to the engine. The amount of fuel supplied to the metering system is varied by mixing air with the fuel supplied in response to the variations between the sensed mixture strength and the desired mixture strength. The adjustments are made in steps, and the character of the steps of those adjustments are varied in response to at least one engine running condition.

DETAILED DESCRIPTION OF THE PREFERRED EMBODIMENTS OF THE INVENTION

Figure 1:
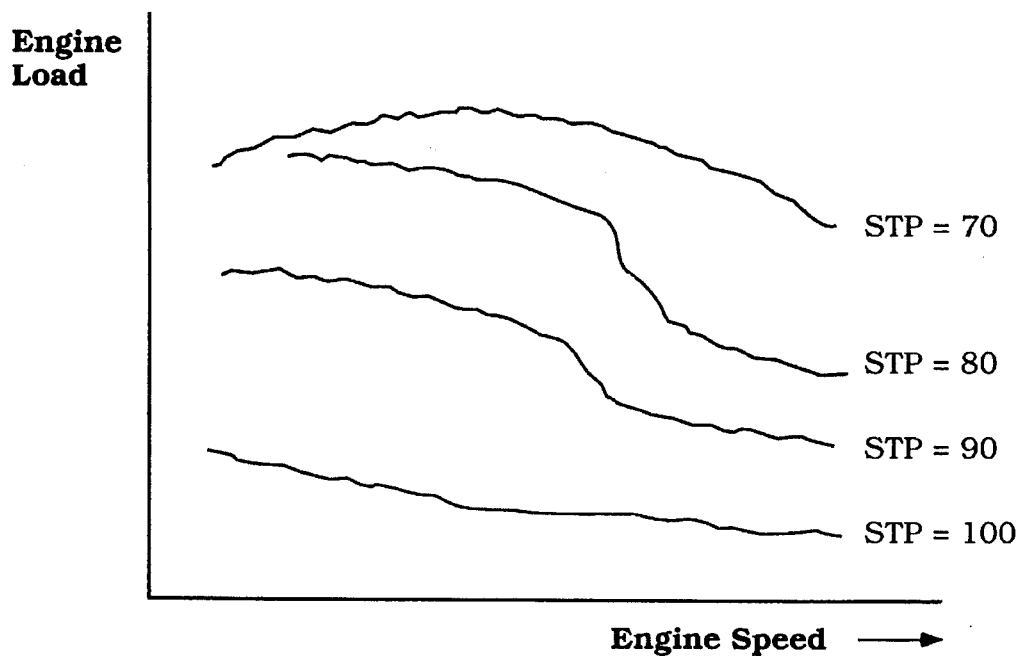
FIG. 1 is a graphical view showing how the engine load or output varies with engine speed at a number of constant stepper motor positions.
Figure 2:
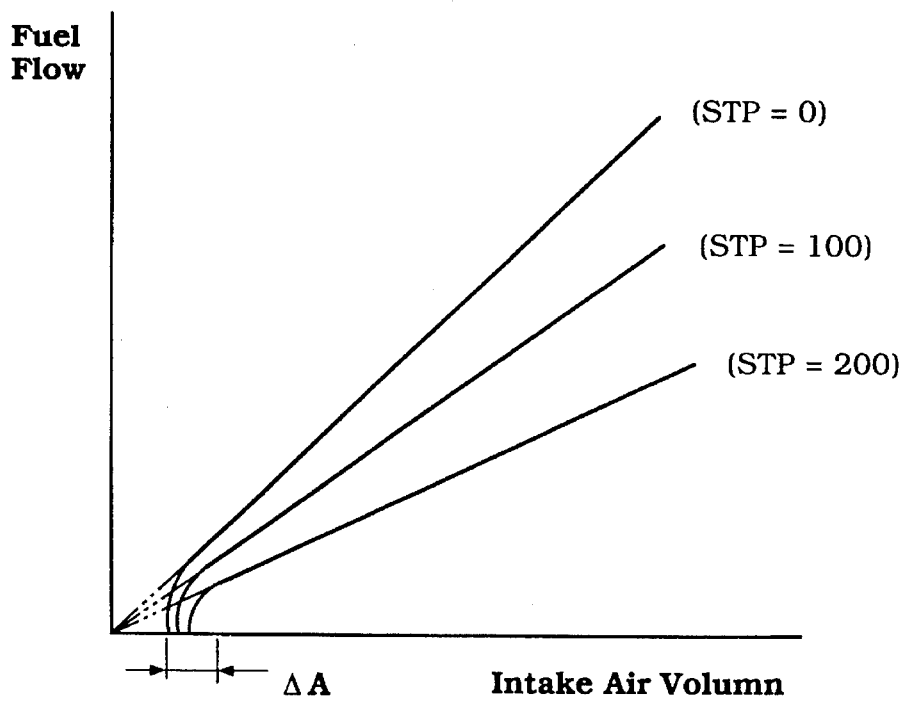
FIG. 2 is a graphical view showing how fuel flow varies with air intake volume under a number of different stepper motor conditions.
Figure 3:
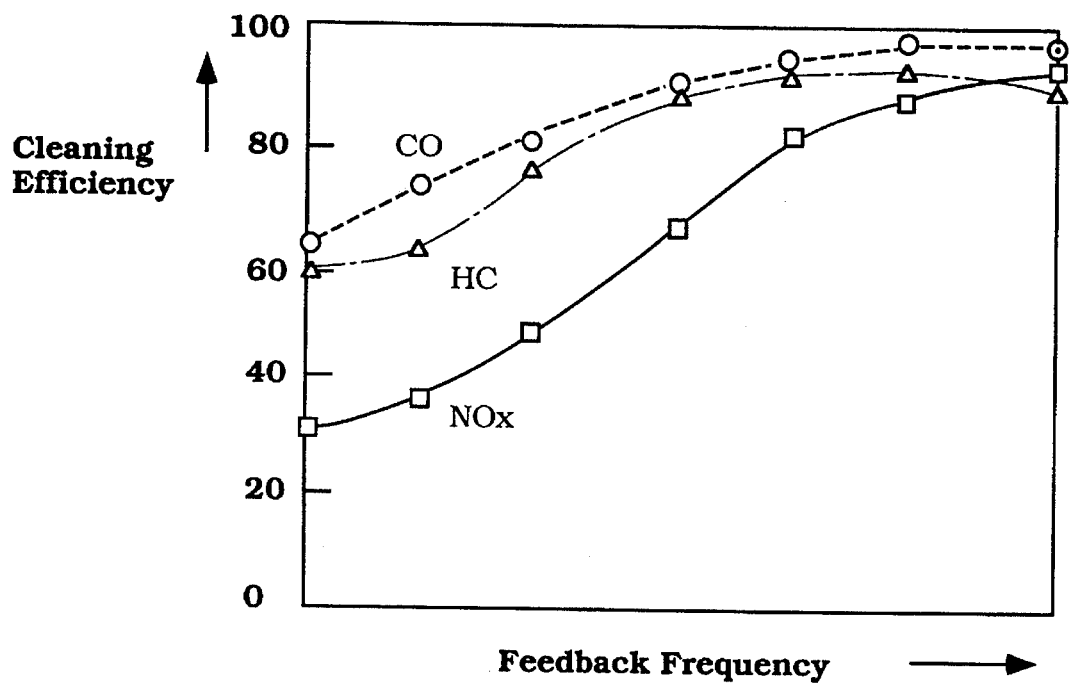
FIG. 3 is a graphical view showing the cleaning efficiency of a three-way catalyst at varying feedback control frequencies.
Figure 4:
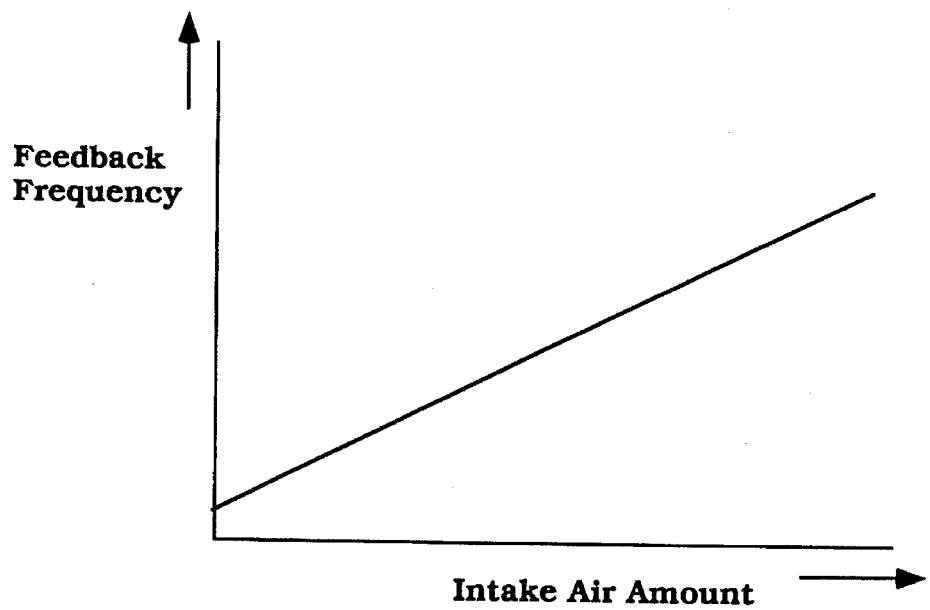
FIG. 4 is a graphical view showing how the feedback frequency is changed in response to intake air amount to obtain maximum converter efficiency.
Figure 5:
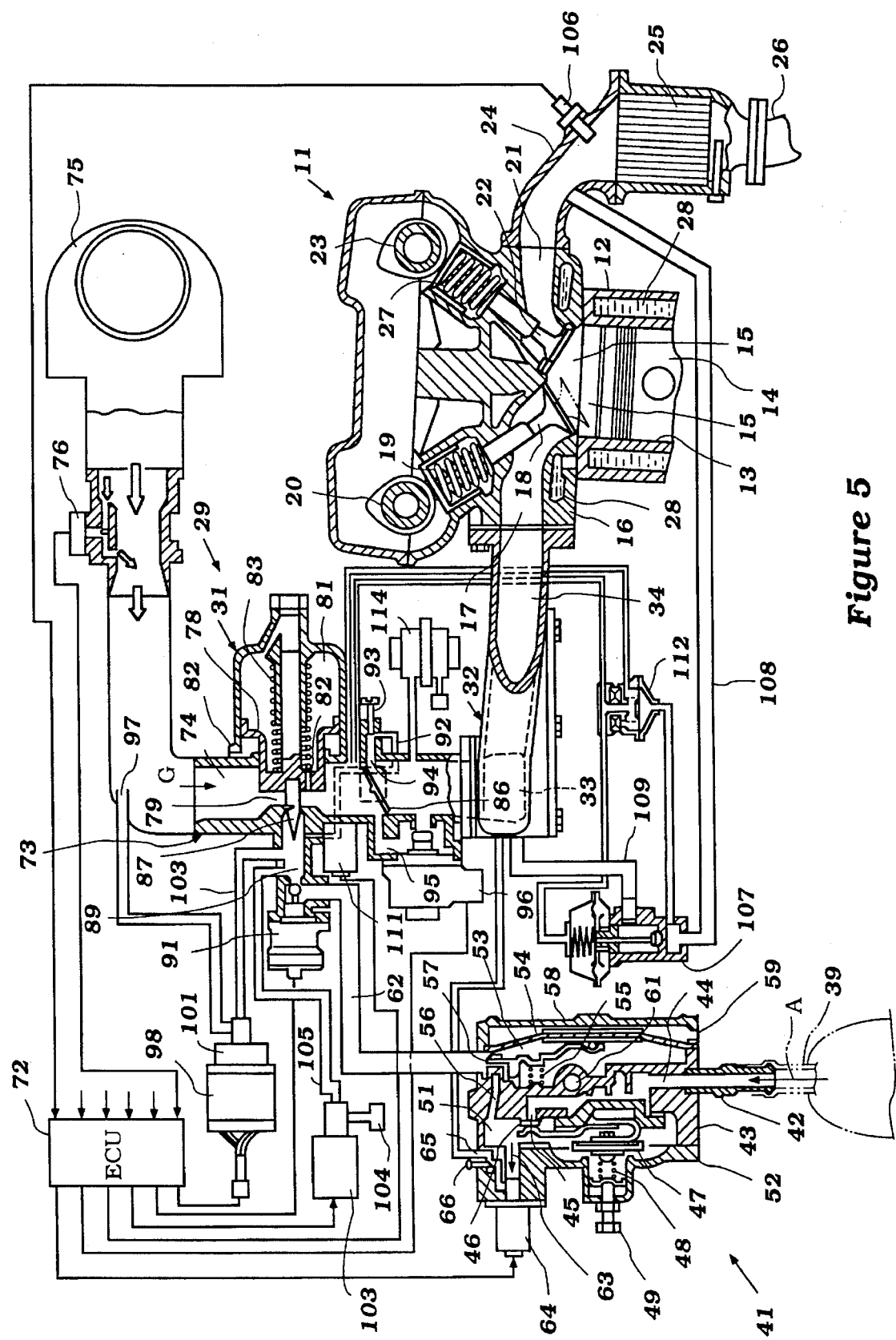
FIG. 5 is a partial cross-sectional view of an internal combustion engine having a fuel supply system constructed and operated in accordance with an embodiment of the invention. Portions of the system are shown schematically.

Referring now in detail to the drawings, and initially to FIG. 5, an internal combustion engine provided with a fuel supply system constructed and operated in accordance with an embodiment of the invention is shown partially and identified generally by the reference numeral 11. The engine 11 is only shown partially because the internal details of the engine, except for its induction and charge-forming system and the controls therefor, form no part of the invention. However, a portion of the engine 11 is depicted for ease in understanding how the invention may be practiced in conjunction with any known types of internal combustion engines. It also should be noted that the charge-forming and control system is not limited to use in reciprocating engines of the type depicted, but may also be employed with rotary types of engines. Also, the invention is described in conjunction with only a single cylinder of a multi-cylinder engine, as it is believed that those skilled in the art can readily understand how the invention is practiced in conjunction with multiple cylinder engines and engines of varying configurations.

The engine 11 includes a cylinder block 12 having one or more cylinder bores 13 in which pistons 14 are slidably supported. The pistons 14 are connected in a known manner by connecting rods (not shown) to a crankshaft for providing an output from the engine 11. The cylinder bore 13 and head of the piston 14 form a combustion chamber 15 along with a cylinder head 16 that is affixed in a known manner to the cylinder block 12.

One or more intake passages 17 extend through one side of the cylinder head assembly 16 and have their communication with the combustion chamber 15 controlled by poppet valves 18 that are slidably supported in the cylinder head 16 in a well-known manner. The valves 18 are operated by tappets 19, which are in turn operated by an intake camshaft 20 in a well-known manner.

One or more exhaust passages 21 extend through the opposite side of the cylinder head 16 from each combustion chamber 15. The flow through the exhaust passage 21 is controlled by poppet-type exhaust valves 22, which are also operated by an overhead mounted exhaust camshaft 23 and tappet 27 in a well-known manner.

An exhaust manifold 24 is affixed to the exhaust side of the cylinder head 16 and receives the exhaust gases from the exhaust passages 21. An outlet of the exhaust manifold 24 communicates with a catalytic converter 25 having a catalyst bed that includes a so-called "three-way catalyzer" for oxidizing carbon monoxide (CO) and hydrocarbons (HC) while reducing nitrous oxides ($NO_x$) to render the exhaust gases as harmless as possible. The exhaust gases thus treated are then discharged to the atmosphere through an exhaust pipe 26 and appropriate exhaust and muffler system (not shown).

In the illustrated embodiment the engine 11 is of the four-valve-per-cylinder type (i.e., two intake valves 18 and two exhaust valves 22 per cylinder). Of course, it should be readily apparent to those skilled in the art that certain features of the invention can be employed with engines having other types of valving or porting systems. A spark plug (not shown) is mounted in the cylinder head 16 and has its spark gap disposed centrally in the combustion chamber 15 for firing the charge therein in a well-known manner.

The engine 11 is also water cooled in the illustrated embodiment, and to this end the cylinder block 12 and cylinder head 16 are provided with a cooling jacket or cooling jackets 28 through which liquid coolant is circulated by means of a coolant pump (not shown). This coolant is then passed through an external heat exchanger (not shown) for cooling in a well-known manner.

A fuel-air charge is supplied to the combustion chamber 17 by means of an induction and charge-forming system, indicated generally by the reference numeral 29, and which includes a charge former in the form of a carburetor 31 which is mounted in the inlet section of an intake manifold 32 that extends along the intake side of the engine and which includes a plenum section 33. A plurality of individual runner sections 34 extend from the plenum section 33 to supply each of the intake ports 17 of the engine 11.

In accordance with the invention, the engine 11 is fueled with a gaseous fuel that is stored under pressure as a liquid in a pressure source, shown in phantom at 39. The fuel stored within the source may be of any of the known hydrocarbon types of gaseous fuel such as butane, propane, or a mixture thereof, or any of the other well-known and used gaseous fuels previously referred to. As is well known, the heat content and burning characteristics of these gases vary from one to another, and this is accommodated for in the system to be described in a manner which will become apparent. The fuel from the high-pressure source 39 is delivered to a vaporized and pressure regulator, indicated generally by the reference numeral 41, through an inlet conduit 42 of the regulator 41 as shown by the arrow A.

The regulator 41 is comprised of an outer housing assembly, including a main body portion 43 in which an inlet passage 44 is formed that communicates with the inlet fitting 42. The passage 44 extends to a first pressure stage regulating port 45 which has its opening and closing controlled by a valve 46 that is operated by an assembly 47 which is biased by a spring 48 having its preload adjusted by a screw 49. The valve 46 opens and closes communication with a chamber 51 formed by the housing 43 and a first cover plate 52 so as to reduce the pressure of the gaseous fuel in a first stage to a pressure of about 0.3 Kg/cm² gage.

The first regulating chamber 51 communicates with a second regulating chamber 53 formed by a cavity in the side of the main housing member 43 opposite the cover plate 52 and which is closed by means of a diaphragm 54 held in place by a second cover plate 55. A passageway 56 communicates the chamber 53 with the chamber 51, and a second pressure regulating valve 57 operated by the diaphragm 54 controls the opening and closing of the passageway 56 so that gas will flow into the chamber 53. A biasing spring 58 acts against the diaphragm 54, and the backside of the diaphragm 54 is opened to atmospheric pressure through an atmospheric port 59 so that the second regulating stage will reduce the pressure of the gaseous fuel in the chamber 53 to just slightly below atmospheric pressure.

The liquid coolant which has been heated in the engine cooling jacket 28 is also circulated through the regulator 41, and to this end there is provided an internal heating passage 61 formed in the main housing 43 which is in communication both with the gas entering the inlet passage 44 and the second regulating chamber 53 so as to maintain a more uniform temperature of the gas in the regulator 41 so as to ensure better vaporization, regulation, and better control of the pressure of the gaseous fuel delivered to the charge former 31.

An outlet conduit 62 delivers the two-stage pressure-regulated gaseous fuel to the main fuel circuit of the carburetor 31. This main fuel circuit will be described later.

Gaseous fuel is also supplied from the regulator 41 to an enrichment circuit in the manifold plenum chamber 33, but at a slightly higher pressure than the fuel pressure supplied to the main fuel circuit. To accomplish this, a second delivery passage 63 is formed in the cover plate 52 and communicates with the first regulating chamber 51. An electrically operated enrichment valve 64 controls the communication of the passage 64 with a further supply passage 65 formed in the cover 52. A flow-controlling needle valve 66 communicates the passage 65 with a conduit 67 which extends to the plenum chamber 33 of the intake manifold 32.

An ECU, indicated generally by the reference numeral 72, is provided for controlling the fuel system, including the enrichment valve 64. The enrichment valve 64 is opened by the ECU 72 under conditions of cold start for a purpose as described in aforenoted U.S. Pat. No. 5,337,722. This cold starting supply of fuel for enrichment purposes is not done for normal cold starting reasons. That is, the cold starting enrichment opening of the enrichment valve 64 is accomplished for a testing purpose of the oxygen sensor in accordance with a specific operational strategy described in that patent. In addition to this start-up testing strategy, the enrichment valve 64 may be opened to supply additional fuel under conditions of extreme acceleration, if desired.

The carburetor 31 is of the air valve or constant depression type and includes a main body portion 73 which defines an air horn 74 that receives atmospheric air, indicated by the arrow G, from a suitable air cleaner and/or air silencer 75. The air cleaner 75 has a filter element 6 through which air is drawn from an atmospheric air inlet 7 for filtration and silencing and delivery to the air horn 74 of the carburetor 31. An air flow sensor 76 is disposed in the outlet of the air cleaner 75 and outputs its signal to the ECU 72. The air cleaner 75 may also be provided with a sensor which senses when its filter element becomes clogged, and this sensor also will output a signal to the ECU 72. Such sensors may sense clogged filters by measuring the pressure difference across the filter or in any other manner.

Since the carburetor 31 is of the air valve or constant depression type, it has no venturi section as such. Rather, it is provided with a sliding type of piston 78 which cooperates with an induction passage 79 formed downstream of the air horn 74 for changing the effective flow area and maintaining a constant vacuum in the induction passage at the piston 78. As is typical with this type of air valve carburetor, the sliding piston 78 is contained within a chamber 81 which receives air pressure from a point below the sliding piston 78 through a bleed port 82.

A coil compression spring 83 is also provided in the chamber 81 so as to provide an opposing bias on the piston 78 toward its closed position. The opposite side of the chamber 81 is exposed to atmospheric through an atmospheric air port 85. As a result, as the vacuum or pressure in the induction passage downstream of the piston 78 decreases, the piston 78 will be urged inwardly into chamber 81 to open the flow passage and maintain a substantially constant vacuum, as is well known in this art.

A manually operated throttle valve 86 is provided in the induction passage 79 downstream of the piston 78 and controls the supply as air and fuel to the manifold 32, and specifically its plenum chamber 33.

The piston 78 carries a metering rod or needle valve 87 that cooperates with a main metering jet 88 of a fuel supply chamber 89. The metering rod 87 will cooperate with the metering jet 88 to provide a progressively increasing flow area as the piston 78 moves to open the induction passage 79. The taper of the metering rod 87 and jet 88 are configured so as to provide the desired air-fuel ratio, as will be determined by the performance of the engine. However, fine variations in air-fuel ratio are adjusted in a manner which will be described.

The conduit 62 from the regulator 41 supplies the fuel mixing chamber 89 of the carburetor 31. A stepping motor controlled fuel control valve 91 is incorporated for providing a fine adjustment of fuel flow from the conduit 62 into the fuel conduit 89. The fuel control valve 91 has a setting that is adjusted depending upon the type of fuel which is supplied to the engine and other characteristics, including such things as flow resistance of the air cleaner 75 so as to maintain the desired air-fuel ratio. That is, it has been noted that the various forms of gaseous fuels may be employed, and the fuel control valve 91 is operated so as to adjust the amount of fuel supplied, depending upon the heat content of the fuel used.

As has been noted, there are various types of gaseous fuels which may be available. Since the amount of fuel supplied is controlled generally by the cooperation of the metering rod 87 with the metering jet 88, the fuel flow is primarily volumetric in nature. The heat content per cubic foot of various gaseous fuels may be quite different. Thus, fuels that have a lower heat content per cubic foot require more fuel flow to maintain the desired air-fuel ratio, while fuels having a higher fuel content require a lower fuel flow. Thus, if a higher heat content fuel is employed, the valve 91 is restricted further, while if a lower heat content fuel is employed, the valve 91 is opened to provide more fuel flow. In addition, the aforenoted air filter condition sensing device may be provided to sense the pressure drop across the air cleaner 75 and change the adjustment of the valve 91 as the flow restriction increases. This will ensure against the mixture becoming overly rich as the filter element accumulates foreign particles from the air inducted.

The carburetor 31 is also provided with an idle circuit that includes a passageway 92 that is supplied from the main fuel chamber 89. An adjustable needle valve 93 is incorporated in this conduit and controls the flow through an idle port 94 positioned downstream of the idle position of the throttle valve 86 so as to control idle fuel flow. In a conventional air valve or constant depression carburetor, an idle circuit is not normally supplied. However, in connection with this invention it is extremely important to control the air-fuel ratio accurately under all running conditions.

If no idle circuit were supplied, the mixture would tend to be overly rich when operating at idle or, alternatively, would be become somewhat lean when operating under off/idle conditions. The reason for this is that there is an initial range of throttle movement from the idle to an off/idle position wherein the sliding piston 78 will not undergo any movement. Hence, if the mixture is at the proper mixture strength when operating at idle, as the system goes slightly off idle, it will tend to lean out. To avoid this leaning out under off/idle, it has previously ben the practice to provide a somewhat richer than necessary idle mixture, which provides emission control problems.

By employing the separate idle circuit it will be ensured that the appropriate air-fuel ratio can be obtained under all conditions. For example, when operating at idle and the throttle valve 86 in its full idle position, some air will be bled into the fuel chamber 89 through the metering jet 88, and hence it is possible to obtain a leaning of the idle fuel supply. However, a throttle valve 86 moves to the off/idle condition, then the manifold vacuum will be exerted at the metering jet 88, even though the piston 78 has not yet moved, and the air bleed will be cut off and primarily fuel will be supplied through the idle discharge port 94 so as to avoid the leaning of the mixture which would occur in a carburetor not having an idle circuit. As a result of this, it is possible to control the air-fuel ratio as desired under idle or slightly off/idle conditions.

An idle bypass passageway 96 extends between the upstream and downstream sides of the throttle valve 86 when in its idle position and has an electrically controlled valve 96 for controlling the air bypassing the throttle valve 86, and accordingly adjusting the idle speed. The valve 96 is controlled by the ECU 72 so as to maintain stability in the idle speed. If the idle speed tends to fall below the desired idle speed, the valve 96 is opened so as to bypass additional air flow so as to increase the idle speed to the desired speed.

On the other hand, if the idle speed is too high, the valve 96 will be closed to reduce the idle speed.

As is well known, the cooperation of the metering rod 87 with the metering jet 88 and the idle-adjusting screw 93 are designed to provide control over the air-fuel ratio supplied to the engine combustion chambers 15. This type of carburetor is extremely effective in ensuring good air-fuel control under all running conditions due to the use of the constant pressure drop through the induction passage provided for in the illustrated embodiment by the sliding piston 78. However, the adjustment provided by the metering rod 87 and main metering jet 88 and the idle adjusting screw 93 do not permit finite adjustments to accommodate variations in air-fuel ratio as may occur during normal running engine due to a variety of factors. Even small variations of air-fuel ratio can have significant differences in both the efficiency of operation of the catalytic converter 25 and also the total control of exhaust gas emissions. Therefore, in accordance with an important feature of this invention, an arrangement is provided for providing an even finer adjustment in the air-fuel ratio and a control arrangement for such an adjustment.

This adjustment includes an arrangement for mixing air with the fuel supplied to the chamber 89 of the carburetor 29. To this end there is provided an air bleed port 97 which opens into the induction downstream of the filter element of air cleaner 75. The air bleed port 97 supplies air to an air bleed control valve 98, which includes a valve element (not shown) that is operated by a stepping motor 101 under control of the ECU 72 in a manner which will be described. The valve element controls the flow of air from the inlet port 97 to the chamber 89 through an air bleed passage 102. As a result, the air-fuel ratio will be varied as atmospheric air is bled into the chamber 89 to provide a more accurate control of air-fuel ratio. Since the chamber 89 supplies both the main metering jet and the idle circuit through the line 92, the air-fuel ratio in each circuit will be adjusted by the air bleed valve 98.

Under sudden decelerations caused by rapid closure of the throttle valve 86 when the engine 11 is running at high speed, the fuel which is drawn into the combustion chambers will not burn, but will be discharged into the catalytic converter. This fuel then will be burned by the catalyst and cause over-temperature conditions to exist in the catalyst. To avoid this there is provided a quick air bleed valve, indicated generally by the reference numeral 103, which draws atmospheric air from a source, such as through a filter element 104 or from the air cleaner 75 downstream of its filter element and delivers it into the chamber 89 through a passageway 105. When a rapid deceleration condition is sensed, as may be sensed by the increase in vacuum in the induction passage, as for example as sensed by a vacuum switch 114, the quick air bleed valve 103 will be opened by the ECU 72. This will cause air rather than fuel to be drawn into the induction system through the main metering jet 88 and idle jet 94, and thus in effect shut off the supply of fuel to the engine under these conditions.

Reference has been made to the control of the air-fuel ratio through the air bleed valve 98. The air-fuel ratio is, in the illustrated embodiment, determined by means of an oxygen sensor, indicated generally by the reference numeral 106, which is positioned in the exhaust manifold 23 immediately upstream of its outlet 24 to the catalytic converter 25. The oxygen sensor 106 is, in a preferred embodiment of the invention, of the type known as a $\lambda$ sensor which senses when the air-fuel ratio is either stoichiometric or on the lean or rich side. This is determined by the output of a signal indicative of oxygen in the exhaust gases. If little or no oxygen is present, it is known that the engine is running at a richer than stoichiometric mixture, and the sensor 106 will output a signal. If there is no output signal from the λ sensor 106, then it is known that the mixture is operating at stoichiometric or on the lean side, as is preferred. Other types of oxygen sensors, however, may be used.

The engine 11 is also provided with an EGR system for controlling NO$_x$ emissions, and this includes an EGR valve, indicated generally by the reference numeral 107, which controls the flow of exhaust gases through an EGR line 108 leading from the exhaust manifold 24 back to the plenum chamber 33 of the intake manifold 32 through a second EGR line 109. The EGR valve 107 may be controlled in any suitable manner and by means of any suitable strategy utilizing an EGR control 112.

As has already been noted, the ECU 72 controls a number of components of the engine, including the enrichment valve 64, the idle control valve 96, the high-speed bleed 103, the fuel control valve 91, and the air bleed valve 98. In addition, there is provided an idle fuel cut-off valve 111 that controls the flow through the idle discharge line 92 to shut off the flow of idle fuel under certain conditions, as will be described. This valve 111 is also controlled by the ECU 72. The valve 111 functions to achieve basically the same effect as the quick air bleed valve 103, and in some conditions it need not be necessary to supply both the idle shut-off valve 111 and the quick air bleed valve 103.

Certain ambient and engine running conditions are supplied to the ECU 72 to implement its control strategy. These inputs are, for example, indicative of throttle position as provided for by a throttle position sensor (not shown), engine coolant temperature as supplied by a coolant temperature sensor that extends into the water jacket 28 of the engine, engine speed as provided for by an engine speed sensor (not shown), the output from the λ sensor 106, and exhaust gas temperature as provided for by an exhaust temperature sensor 113 that extends into the catalytic converter 26 which not only indicates engine exhaust gas temperature but also temperature at which the converter 25 is operating. There is further provided a vacuum sensor or switch 114 that senses intake manifold vacuum downstream of the throttle valve 86 and outputs its signal to the ECU. In addition to these noted sensors, various other ambient or running conditions may be sensed and inputted to the ECU 72 for its engine control and operation.

In operation, when the throttle valve 86 is closed, the idle circuit comprised of the fuel portion 92 and air portion 95 will control the speed of the engine and its running. The piston 78 will be held in the minimum throat position under this condition, and substantially no fuel will be supplied through the main jet 88. As the throttle valve 86 is opened, the piston 78 will also open, depending upon the pressure difference, and fuel will begin to flow from the mixing chamber 89. The basic fuel control during both of these operations follows a feedback strategy of the type generally described in the aforenoted patent. However, in accordance with the invention, the actual steps which the stepper motor 98 executes will be adjusted by modifying the position of the stepper motor set by that system by a feedback coefficient FK. That is, the actual number of steps employed STP=FK+ 1,000.STP/1,000.

Figure 6:
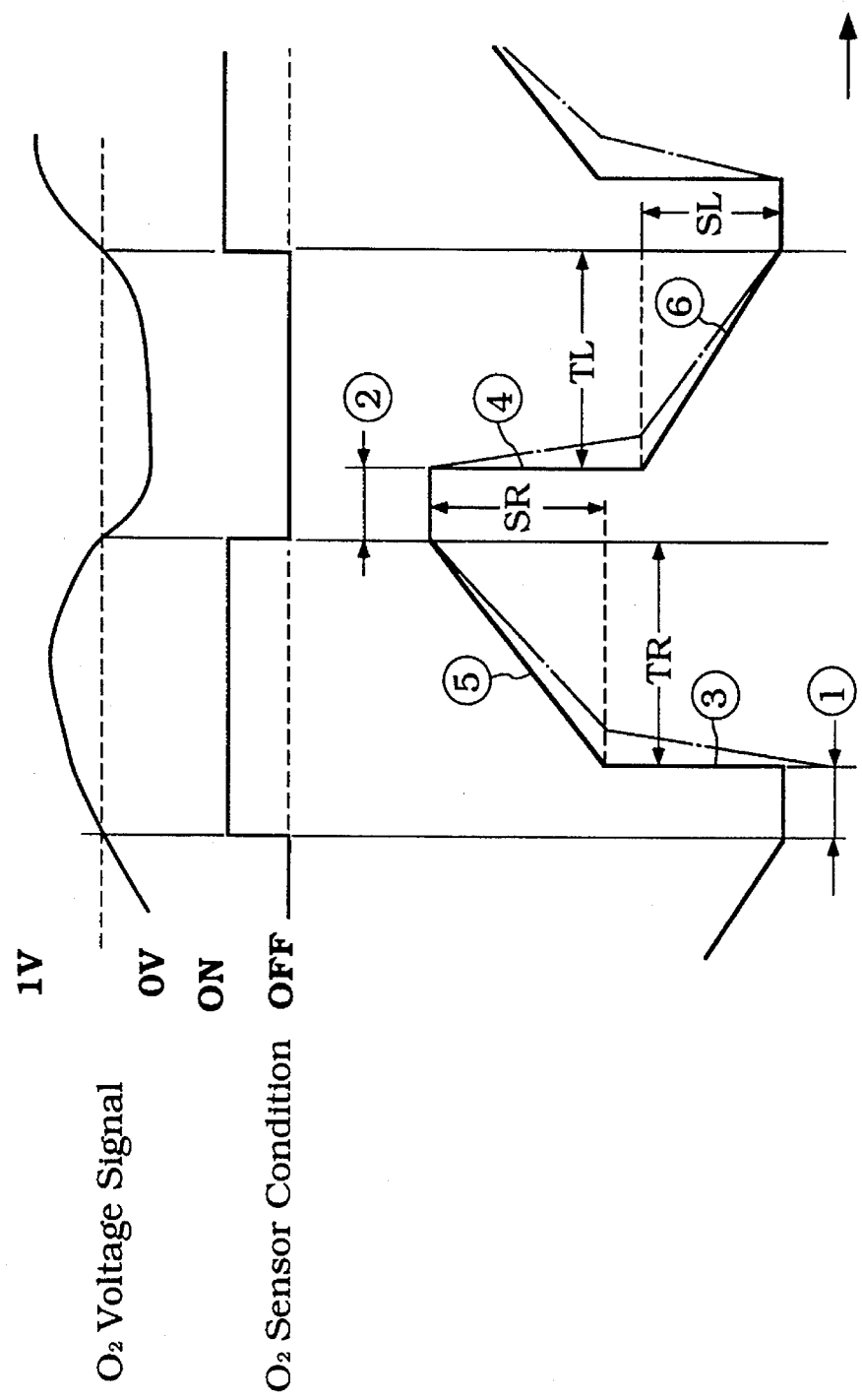
FIG. 6 is a graphical view showing how the feedback control is varied during engine running to illustrate the various control routine modes employed, with the control routine modes being indicated by the reference numerals 1–6.

The basic control strategy employs three different steps of operation when making the transition to either lean and richen the mixture strength (a total of six steps for total control) so as to maintain stoichiometric or desired air-fuel ratio. This may be understood by reference to FIG. 6, which shows an example wherein the mixture goes rich and the oxygen sensor 106 outputs a signal which initiates the control routine to lean the mixture by opening the stepper motor 101 of the air bleed valve 98 so as to lean the fuel flow to the engine. If the mixture becomes lean, it is enrichened so as to maintain the stoichiometric or desired air-fuel ratio. This control routine takes place in stages which comprise the following, although not in that order:

(1) Rich delay (2) Lean delay (3) Rich skip (4) Lean skip (5) Rich proportional coefficient (6) Lean proportional coefficient The graph in FIG. 6 indicates the output signal voltage of the oxygen sensor, its on or off condition, and the position of the stepper motor or air bleed valve, with the lower portion showing the maximum rich and the upper portion showing the maximum lean.

It should be noted that when the engine starts running, the feedback coefficient FK is set at zero, and the actual stepper motor position (STP) is determined from engine condition based upon memorized data from previous experience to maintain the stoichiometric ratio. Thereafter, the feedback coefficient FK is varied as a function of engine load or condition when the engine is operating at idle. Engine load is determined from intake manifold vacuum as sensed by the pressure sensor 114. Four basic pressures are set in a table, as indicated below, these being the absolute pressures of 300, 450, 600, and 760 mm of mercury.

TABLE 1

| Operating Status | Idle | Non-Idle | | |
|---|---|---|---|---|
| Absolute intake pressure (mm Hg) | | 300 | 450 | 600 | 760 |
| Rich delay (1) | 16 | 16 | 16 | 12 | 8 |
| Lean delay (2) | 12 | 12 | 12 | 12 | 12 |
| Rich skip (3) | 10 | 30 | 70 | 80 | 100 |
| Lean skip (4) | 10 | 30 | 70 | 80 | 100 |
| Rich timer frequency TR | 24 | 20 | 16 | 12 | 8 |
| Lean time frequency TL | | | | | |
| Rich proportional coefficient SR | 2 | 3 | 6 | 8 | 12 |
| Lean proportional coefficient SL | 2 | 3 | 5 | 8 | 12 |

At intermediate pressures the table is interpolated.

As may be seen in FIG. 6, the solid line portion of the lower curve shows the actual control signal being sent, while the dot-dash curve shows the actual reaction of the stepper motor. The difference is, of course, caused by a delay in the system. Also as will be noted the operation occurs in steps but the curves are smoothed so that these steps will not appear.

Basically, the control strategy is that if the oxygen sensor begins to output an "on" signal, which occurs when the voltage goes above a certain point, for example, 500 mV, then the rich correction routine begins by first setting a rich delay period (1) selected from Table 1, depending on the running conditions of the engine at the time, i.e., load. The greater the load, the less the delay time will be and hence the response is quicker. After the rich delay time period has elapsed, the program moves to the control phase 3, wherein a rich skip operation is begin that begins at operation of the stepper motor utilizing the value for FK set from Table 1. Once this initial rapid adjustment has been made, then the program moves into the rich timer correction routine along the rich proportional coefficient SR, which sets the slope of SR divided by TR, and this continues until the oxygen sensor no longer outputs a signal.

When the oxygen sensor ceases to output a signal, then the program goes into the lean correction mode by setting a lean delay (2), again selected from Table 1. There is then the rapid lean skip resetting of the stepper motor (4), and then the program moves into the lean proportional coefficient stage where the stepper motor continues to be moved in an opening direction to enrichen the mixture until the oxygen sensor 106 again turns on.

Figure 7:
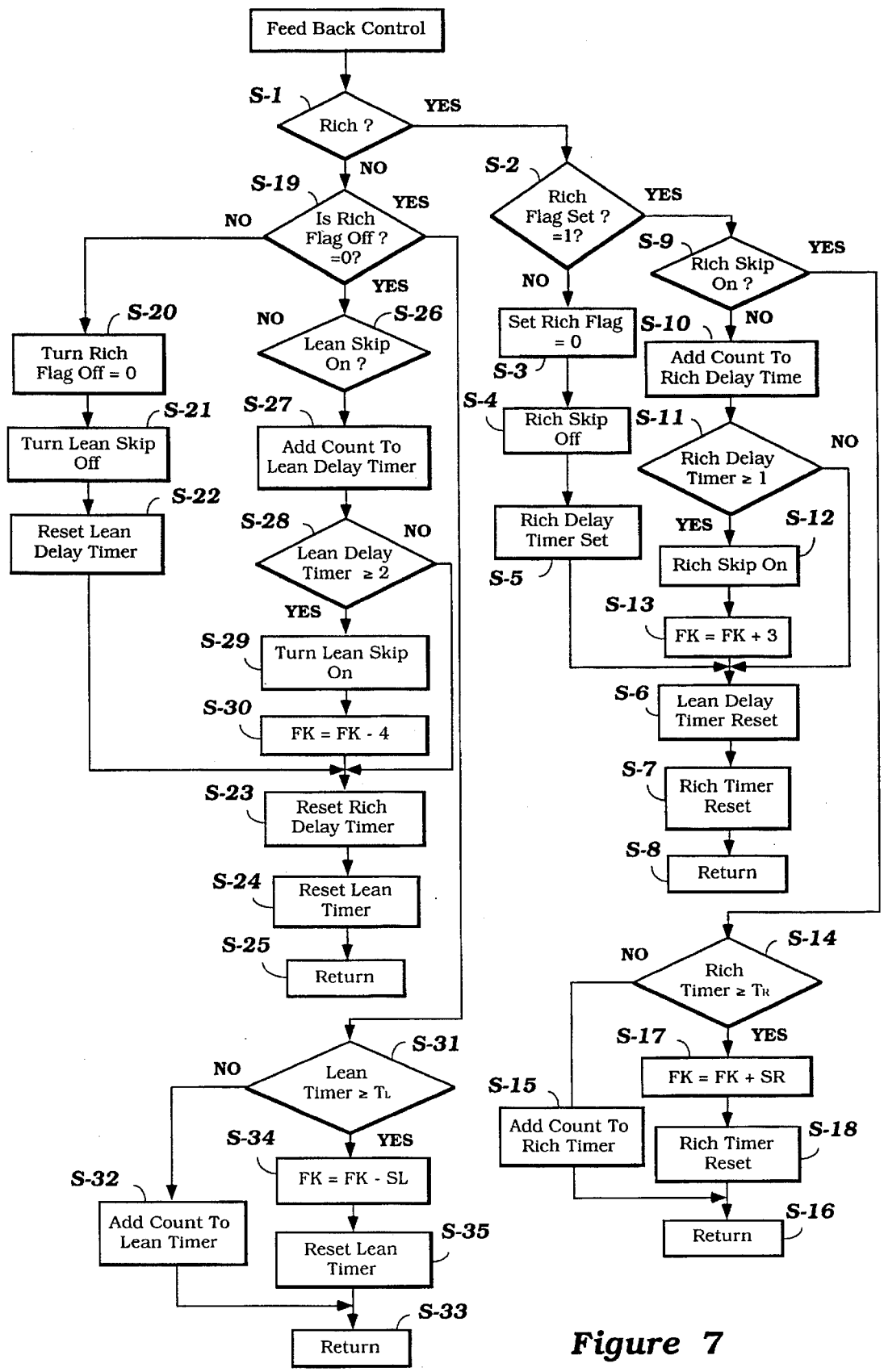
FIG. 7 is a block diagram showing the control routine for establishing feedback control and the correction factors associated therewith.

The actual control routine will now be described by reference to FIG. 7 with reference also to FIG. 6 and Table 1. When operating in the feedback control mode, the program moves to the step S1 to sense the condition of the oxygen sensor 106 to determine if the engine is running rich or not. Assuming that the engine has begun to run rich and the sensor 106 outputs a signal, the program moves to the step S2 to determine if the rich flag has been set. This is a condition when the setting of the rich flag equals "1."

Since the engine has first begun to run rich at this point in time and the response will be "no," the program moves to the step S3 so as to set the rich flag equal to 1 (turn it on) and then moves to the step S4 to shut off the rich skip operation. Also, the program at the step S5 resets the rich delay timer to zero.

The program then moves to the step S6 so as to reset the lean delay timer and to the step S7 to reset the rich timer. The program then moves to the step S8 to return to the step S1.

Having returned to the step S1, the program will follow the path to the step S2, but now the rich flag has been set so the program goes to the step S9. At this point it is determined if the rich skip is "on." However, it has been turned off at the step S4, and hence the program moves to the step S10 to add a count to the rich delay timer which was set at S5. Then, at the step S11 it is determined if the rich delay timer has reached the count set forth on Table 1 for the running condition. If it has not, the program then moves back to the step S7 and returns at the step S8. Note that the delay times are longer at idle and high load (low vacuum - high absolute pressure) thus the frequency is greater than at normal, mid-range conditions.

Once the time selected on the table for the rich delay timer has been reached at the step S11, the program moves to the step S12, assuming the engine is still rich, to turn on the rich skip mode. The program then moves to the step S13 to set a new value for FK equal to the normal value for this condition, plus the value selected from Table 1 for the engine running condition. The program then continues to move through the steps S6, S7, and S8 and returns back to the step S1. At this time the operation of the rich skip has been completed, and the program moves into the control routine portion shown in FIG. 6 and indicated as (5).

Thus, the program moves through the steps S1, S2, and S9 where it is determined that rich skip is on, and the program then moves to the step S14. At the step S14 the condition of the rich timer is determined, and this is compared with the value set in Table 1 for the engine condition. Assuming the control routine has been progressing as described, the initial time the reading at S14 is made, the answer will be "no," and the program moves to the step S15 so as to add a count to the rich timer and then to the step S16 to return.

Upon return, the program will continue to move through the steps S1, S2, S9, and S14 until the response at S14 is yes. The program then moves to the step S17 so as to set a new coefficient for FK which is equal to FK plus SR, as determined from Table 1. The program then returns and will continue to follow this path as long as the output of the oxygen sensor 106 continues to indicate a rich mixture.

If at the step S1 it is determined that the oxygen sensor 106 is not outputting a signal indicative of a rich condition, then the program moves to the step S19 so as to determine if the rich flag has been sent off (equals zero). Assuming that this has occurred at the completion of the previously described routine, the rich flag will still be on, and the program then moves to the step S20 so as to turn the rich flag off. The program then moves to the step S21 to turn the lean skip switch off, and to the step S22 to reset the lean delay timer. The program then moves to the step S23 so as to reset the rich delay timer, to the step S24 to reset the lean timer, and to the step S25 where it returns.

When returning to the step S1, assuming the engine has not gone rich, the program will move to the step S19. Since the rich flag has now been turned off, the answer will be "yes" and the program will go to the step S26. This determines whether the lean skip switch has been turned "on" or "off." However, since the lean skip switch has been turned off at the step S21, the response will be "no," and the program moves to the step S27 to add a count to the lean delay timer which has been reset to zero at the step S22.

The program then moves to the step S28 so as to determine if the lean delay timer period set on Table 1 for the running condition has been reached. If it has not, the program repeats back through the steps S23, S24, S25 to the steps S19, S26, and S27 until the time period set from Table 1 for the lean delay timer has been reached. At that time the program moves to the step S29 so as to turn the lean delay operation "on," and to the step S30 to set a new value for FK. This value is set at the value previously applied for that condition, reduced by the corrective factor 4 selected from Table 1 for the lean delay value. The program then continues to repeat on through the steps S23, S24, and S25 and returns.

Assuming the engine has not gone rich in the meantime, the program continues to move through the steps S19 and S26, but now the lean skip switch will have been turned on at the step S29, and the program moves to the step S31. At the step S31 it is determined if the lean timer has reached the value set on Table 1 for the engine condition. If it has not, the program moves to the step S32 to add a count and then to the step S33 to return.

Assuming the engine has not turned rich, the program continues to repeat then through the step S31 until the lean timer has reached the time TL set in accordance with the value of Table 4, and when this occurs, the program moves to the step S34 to set a new value for FK. This is the previous value for FK at this figure minus the value SL set on Table 1. The program then moves to the step S35 to reset the lean skip timer, and the program moves to the step S33 to repeat.

Therefore, it should be readily apparent that this control routine is very effective in ensuring that the actual engine conditions which will effect the proper stoichiometric ratio or desired air-fuel ratio have been met. Also, the frequency of making the adjustments is varied in response to engine condition by changing the adjustment speed and delay times so as to be more responsive under the critical conditions of idle and high load operation. Of course, the foregoing description is that of a preferred embodiment of the invention, and various changes and modifications may be made without departing from the spirit and scope of the invention as defined by the appended claims.

We claim:

1. A method of controlling the mixture strength of an engine with a feedback control comprising the steps of supplying fuel to a charge former in an mount determined by at least one engine running condition, sensing the mixture strength, comparing the mixture strength with the desired mixture strength, and adjusting in steps the amount of fuel supplied in a direction to obtain the desired mixture strength and controlling the character of the steps of adjustment in response to at least one engine running condition.

2. A method of controlling the mixture strength of an engine as defined in claim 1, wherein the incremental degree of the steps of adjustment are varied.

3. A method of controlling the mixture strength of an engine as defined in claim 2, wherein the incremental degree of adjustment of the steps is based on a corrective factor.

4. A method of controlling the mixture strength of an engine as defined in claim 3, wherein the character of adjustment includes setting a time period before the correction is made, and this time period is also varied depending upon at least one engine running condition.

5. A method of controlling the mixture strength of an engine as defined in claim 3, wherein the corrective factor is based upon an engine running condition.

6. A method of controlling the mixture strength of an engine as defined in claim 5, wherein the correction is based upon engine speed.

7. A method of controlling the mixture strength of an engine as defined in claim 5, wherein the engine running condition is load.

8. A method of controlling the mixture strength of an engine as defined in claim 7, wherein the load is determined by sensing intake manifold vacuum.

9. A method of controlling the mixture strength of an engine as defined in claim 8, wherein the correction is also based upon engine speed.

10. A method of controlling the mixture strength of an engine as defined in claim 1, wherein the timing of the steps of adjustment is controlled.

11. A method of controlling the mixture strength of an engine as defined in claim 10, wherein the time of the steps of adjustment is based upon an engine running condition.

12. A method of controlling the mixture strength of an engine as defined in claim 11, wherein the timing of the steps is based upon engine speed.

13. A method of controlling the mixture strength of an engine as defined in claim 11, wherein the engine running condition is load.

14. A method of controlling the mixture strength of an engine as defined in claim 13, wherein the load is determined by sensing intake manifold vacuum.

15. A method of controlling the mixture strength of an engine as defined in claim 14, wherein the time of the steps is also determined by engine space.

16. A method of controlling the mixture strength of an engine as defined in claim 1, wherein the fuel is a gaseous fuel and the amount of fuel supplied is adjusted by mixing air with the gaseous fuel before it is mixed with air in the charge former.

17. A method of controlling the mixture strength of an engine as defined in claim 16, wherein the charge former includes a fuel metering member controlled in response to the air flow through the charge former for adjusting the amount of fuel flow in response to the at least one running condition.

18. A method of controlling the mixture strength of an engine as defined in claim 17, wherein the character of the step of adjustment varied is the incremental amount of the adjustment.

19. A method of controlling the mixture strength of an engine as defined in claim 18, wherein the adjustment is based on a corrective factor.

20. A method of controlling the mixture strength of an engine as defined in claim 19, wherein the character of adjustment includes setting a time period set before the correction is made, and this time period is also varied depending upon at least one engine running condition.

21. A method of controlling the mixture strength of an engine as defined in claim 19, wherein the corrective factor is based upon an engine running condition.

22. A method of controlling the mixture strength of an engine as defined in claim 21, wherein the correction is based upon engine speed.

23. A method of controlling the mixture strength of an engine as defined in claim 21, wherein the engine running condition is load.

24. A method of controlling the mixture strength of an engine as defined in claim 23, wherein the load is determined by sensing intake manifold vacuum.

25. A method of controlling the mixture strength of an engine as defined in claim 24, wherein the manner of control of the steps is also determined by engine speed.

26. A method of controlling the mixture strength of an engine as defined in claim 17, wherein the timing of the steps of adjustment is changed.

27. A method of controlling the mixture strength of an engine as defined in claim 26, wherein the timing of the steps is based upon an engine running condition.

28. A method of controlling the mixture strength of an engine as defined in claim 27, wherein the timing of the steps is based upon engine speed.

29. A method of controlling the mixture strength of an engine as defined in claim 27, wherein the engine running condition is load.

30. A method of controlling the mixture strength of an engine as defined in claim 29, wherein the load is determined by sensing intake manifold vacuum.

31. A method of controlling the mixture strength of an engine as defined in claim 30, wherein the timing of the steps is also determined by engine speed.

32. A charge former fur controlling the mixture strength of an engine with a feedback control, means for supplying fuel to the charge former in an mount determined by at least one engine running condition, a sensor for sensing the mixture strength, control means for comparing the mixture strength with the desired mixture strength, and means adjusting in steps the mount of fuel supplied in a direction to obtain the desired mixture strength and for controlling the character of the steps of adjustment in response to at least one engine running condition.

33. A charge former for controlling the mixture strength of an engine as defined in claim 32, wherein the character of the steps adjusted is the incremental degree of adjustment.

34. A charge former for controlling the mixture strength of an engine as defined in claim 33, wherein the character of the adjustment of the step is based on a corrective factor.

35. A charge former for controlling the mixture strength of an engine as defined in claim 34, wherein a timer sets a time period before the correction is made, and this time period is also varied depending upon at least one engine running condition.

36. A charge former for controlling the mixture strength of an engine as defined in claim 34, wherein the corrective factor is based upon an engine running condition.

37. A charge former for controlling the mixture strength of an engine as defined in claim 36, wherein the sensed engine running condition is load.

38. A charge former for controlling the mixture strength of an engine as defined in claim 36, wherein the sensor senses intake manifold vacuum.

39. A charge formed for controlling the mixture strength of an engine as defined in claim 38, wherein the correction of the steps is also based upon engine speed.

40. A charge former for controlling the mixture strength of an engine as defined in claim 36, wherein the sensor senses engine speed.

41. A charge former for controlling the mixture strength of an engine as defined in claim 32, wherein the character of the step adjusted is the timing of the adjustment.

42. A charge former for controlling the mixture strength of an engine as defined in claim 41, wherein the corrective factor is based upon a sensor that senses an engine running condition.

43. A charge former for controlling the mixture strength of an engine as defined in claim 42, wherein the sensor senses load.

44. A charge former for controlling the mixture strength of an engine as defined in claim 43, wherein the load sensor senses by sensing intake manifold vacuum.

45. A charge former for controlling the mixture strength of an engine as defined in claim 44, wherein speed is also sensed to set the timing of the steps.

46. A charge former for controlling the mixture strength of an engine as defined in claim 44, wherein the sensor senses engine speed.

47. A charge former for controlling the mixture strength of an engine as defined in claim 32, wherein the fuel is a gaseous fuel and the amount of fuel supplied is varied by mixing air with the gaseous fuel before it is mixed with air in said charge former.

48. A charge former for controlling the mixture strength of an engine as defined in claim 47, wherein said charge former includes a fuel metering member controlled in response to the air flow through said charge former for varying the amount of fuel flow in response to the at least one running condition.

49. A charge former-for controlling the mixture strength of an engine as defined in claim 48, wherein the character of the step is the degree of adjustment.

50. A charge former for controlling the mixture strength of an engine as defined in claim 49, wherein the adjustment of the step is based on a corrective factor.

51. A charge former for controlling the mixture strength of an engine as defined in claim 5, wherein the corrective factor is based upon this output of a sensor that senses an engine running condition.

52. A charge former for controlling the mixture strength of an engine as defined in claim 51, wherein the sensor senses engine speed.

53. A charge former for controlling the mixture strength of an engine as defined in claim 51, wherein the sensor senses load.

54. A charge former for controlling the mixture strength of an engine as defined in claim 52, wherein the load is sensed by sensing intake manifold vacuum.

55. A charge former for controlling the mixture strength of an engine as defined in claim 54, wherein the speed of the engine is also sensed for determining the correction factor.

56. A charge former for controlling the mixture strength of an engine as defined in claim 55, wherein the character of the step includes a time delay set before the correction is made, and this time period is also varied depending upon the output of a sensor that senses at least one engine running condition.

57. A charge former for controlling the mixture strength of an engine as defined in claim 56, wherein the timing of the adjustment is changed.

58. A charge former for controlling the mixture strength of an engine as defined in claim 57, wherein the corrective factor is based upon a sensed engine running condition.

59. A charge former for controlling the mixture strength of an engine as defined in claim 58, wherein sensed engine running condition is load.

60. A charge former for controlling the mixture strength of an engine as defined in claim 59, wherein the load is sensed by sensing intake manifold vacuum.

61. A charge former for controlling the mixture strength of an engine as defined in claim 60, wherein the engine speed is also sensed to determine the delay.

62. A charge former for controlling the mixture strength of an engine as defined in claim 58, wherein the engine speed is sensed to determine the correction.

* * * * *